C. J. CRAIG.
RESILIENT WHEEL.
APPLICATION FILED JAN. 7, 1909.

951,802.

Patented Mar. 15, 1910.

Witnesses

Inventor
Charley J. Craig
By
Attorneys

UNITED STATES PATENT OFFICE.

CHARLEY J. CRAIG, OF LATHROP, MISSOURI.

RESILIENT WHEEL.

951,802.   Specification of Letters Patent.   Patented Mar. 15, 1910.

Application filed January 7, 1909. Serial No. 471,204.

*To all whom it may concern:*

Be it known that I, CHARLEY J. CRAIG, a citizen of the United States, residing at Lathrop, in the county of Clinton and State of Missouri, have invented certain new and useful Improvements in Resilient Wheels, of which the following is a specification.

This invention comprehends certain new and useful improvements in vehicle wheels, and the invention has for its object an improved device of this character which embodies a peculiar arrangement of parts whereby a resilient connection is afforded between the hub and the rim so as to render the wheel susceptible of absorbing shocks incident to travel over rough roads, the object being attained without employing the ordinary pneumatic tires so liable to puncture, and the wheel possessing to a marked degree the characteristics of simplicity, durability and strength.

With this and other objects in view that will more fully appear as the description proceeds, the invention consists in certain constructions and arrangements of the parts that I shall hereinafter fully describe, and then point out the novel features thereof in the appended claims.

Figure 1:
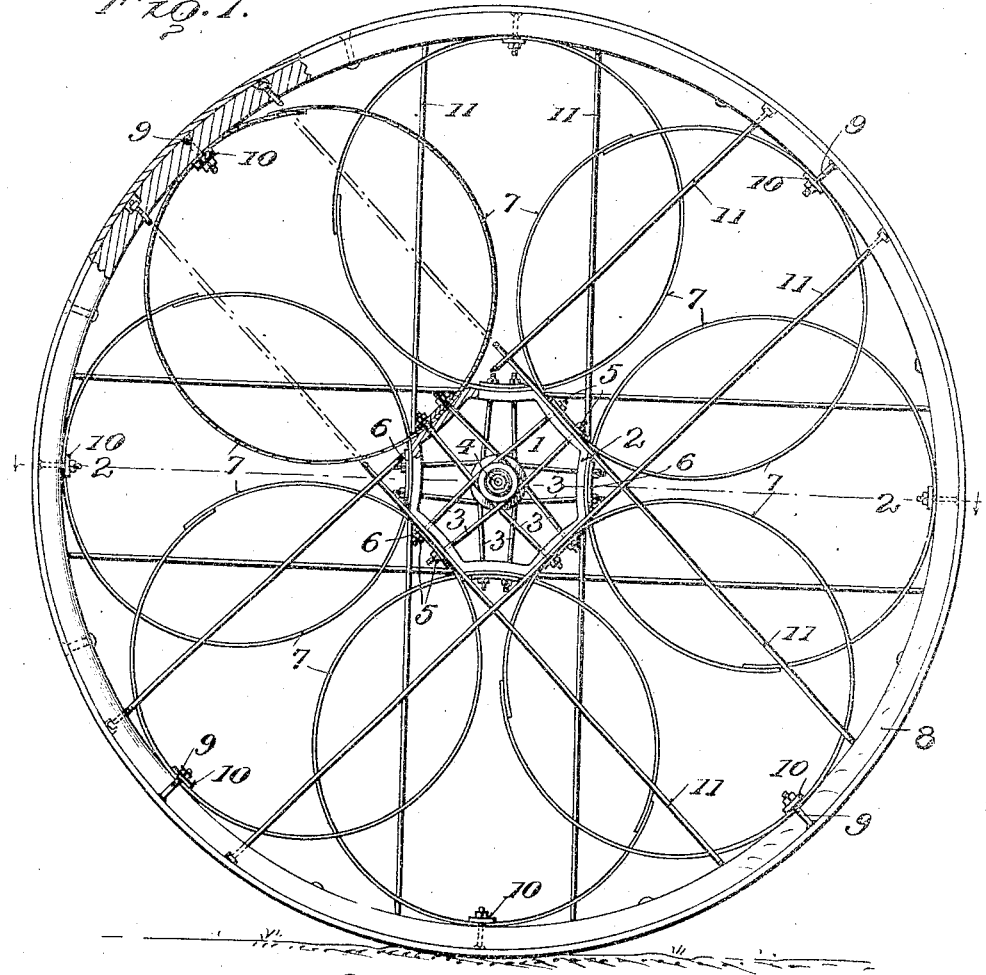
Figure 2:
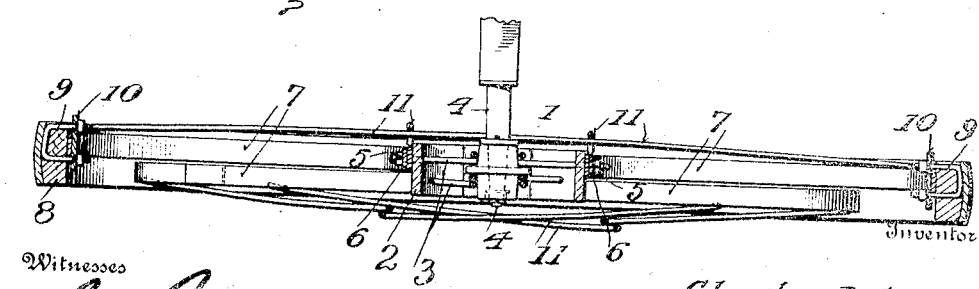

For a full understanding of the invention and the merits thereof, and to acquire a knowledge of the details of construction, reference is to be had to the following description and accompanying drawing, in which:

Figure 1 is a side elevation of a vehicle wheel constructed in accordance with my invention; and, Fig. 2 is a longitudinal horizontal section thereof, the section being taken on the line 2—2 of Fig. 1.

Corresponding and like parts are referred to in the following description and indicated in all the views of the drawing by the same reference characters.

My improved wheel comprises a hub 1 which, in the present instance, embodies a metallic frame 2 that is in the form of a regular polygon, the opposite sides of which are connected by pairs of substantially parallel spaced bolts 3, the various pairs of bolts crossing near the center of the frame to mount the hub upon the axle 4. Nuts 5 work on the extremities of the bolts and are arranged to tighten the same and also to bear against washers 6 that are mounted upon the corresponding extremities of the bolts and extend therebetween. These washers are designed to be tightened against annular springs 7 which are disposed on the hub and are interposed at corresponding points between the frame 2 thereof and the respective washers. The springs are arranged in an annular series, and may be of any number found most effectual in practice, the springs being entirely independent of each other, although the adjacent springs overlap considerably, as best seen in Fig. 1. A rim 8 encircles the series of springs 7 and is secured thereto in any approved manner, as by means of U-bolts 9 that are engaged with the rim and carry glands 10 extending across the respective springs at points substantially diametrically opposite to the washers 6. The rim 8 is constructed of inflexible material such as wood or suitable metal, and is preferably strengthened by two sets of braces 11 that extend across the rim in a substantially chord-like manner, with the braces of one set arranged on the opposite side of the series of springs, from the braces of the other set. These braces are arranged in pairs, with the pairs of one set positioned in staggered relation to those of the other set, the braces of each pair being arranged on opposite sides of the hub 1, in spaced relation thereto, and entirely independent thereof, so as not to interfere with the vibration of the rim and the braces relative to the hub, in the operation of the wheel.

If the wheel encounters an obstruction while traveling along the road, it will be observed that by means of the structure before recited, the rim and its braces will be pressed upwardly by the obstruction relative to the hub 1, the braces being so spaced from the hub as not to interfere with such movement. As the rim 8 moves upwardly, the lowermost springs 7 are compressed, while the other springs of the series are distended so that the vibratory movement of the rim is not transmitted to the hub 1 or the axle 4, and thus the shocks incident to the travel, are effectually absorbed.

Among the many advantages which will recommend this structure, attention is particularly directed to the fact that inasmuch as the annular springs 7 interposed between the hub and the rim are entirely independent of each other, any one of the springs may be quickly removed when occasion demands, without disturbing the other springs of the series. Furthermore, with the fastening means preferably employed in the invention, an old spring may be quickly and conveniently replaced by a new one.

From the foregoing description, in connection with the accompanying drawing, it will be apparent that I have provided an improved vehicle wheel which may be advantageously employed upon automobiles, carriages or the like, and supplements the work of the vehicle springs; which embodies to a marked degree the characteristics of simplicity, durability and efficiency in construction and operation, and which consists of comparatively few parts that may be easily and cheaply manufactured and readily assembled.

Having thus described the invention, what I claim is:

1. A resilient vehicle wheel embodying a rim, a continuous inner frame within the rim, a plurality of springs interposed between the frame and the rim and having their outer portions secured to the latter, and a plurality of brace rods extending entirely across the frame and engaged at their opposite ends with the inner portions of adjacent springs to fasten the springs to the frame.

2. A resilient vehicle wheel embodying a hub, a rim, a continuous inner frame encircling the hub within the rim, resilient means interposed between the frame and the rim, and pairs of brace rods extending entirely across the frame and crossed intermediate of their ends to mount the frame on the hub.

3. A resilient vehicle wheel embodying a rim, a continuous frame of polygonal form within the rim, a plurality of band springs interposed between the frame and the rim and having their outer portions secured to the latter, the inner portions of the springs abutting the respective sides of the polygonal frame, and brace rods extending across the frame between the opposite sides thereof and engaged at their ends with the inner portions of adjacent springs to fasten the springs to the frame.

4. A resilient vehicle wheel embodying a hub, a rim, a continuous inner frame of polygonal form encircling the hub within the rim, a plurality of band springs interposed between the frame and the rim and having their outer portions secured to the latter, the inner portions of said springs abutting the respective sides of the polygonal frame, and pairs of brace rods extending across the frame between opposite sides thereof and engaged at their ends with the inner portions of adjacent springs to fasten the springs to the frame, the pairs of rods being crossed intermediate of their ends to mount the frame on the hub.

In testimony whereof I affix my signature in presence of two witnesses.

CHARLEY J. CRAIG. [L. S.]

Witnesses:
H. C. SHEPHERD,
M. T. CRAIG.